United States Patent Office 3,482,636
Patented Dec. 9, 1969

3,482,636
METHOD OF LESSENING THE INHIBITORY EFFECTS TO FLUID FLOW DUE TO THE PRESENCE OF SOLID ORGANIC SUBSTANCES IN A SUBTERRANEAN FORMATION
Curtis Wendell Crowe, Tulsa, Okla., assignor to The Dow Chemical Company, Midland, Mich., a corporation of Delaware
No Drawing. Filed Apr. 6, 1967, Ser. No. 628,850
Int. Cl. E21b 43/00, 43/25, 43/119
U.S. Cl. 166—307             11 Claims

ABSTRACT OF THE DISCLOSURE

Organic substances including bacterial slimes, algae, synthetic polymers and the like, in the vicinity of a wellbore penetrating and geologic formation, and rendered less inhibitory to passage of fluids to the wellbore by contacting such organic substance with an aqueous composition comprising a sodium hypohalite containing an inhibitor to the corrosivity thereof to metal of which water-dispersible or water-soluble silicates and hydroxides are particularly effective. Most effective results are obtained when the sodium hypohalite-inhibitor solution is followed by an acid flush.

---

The invention provides a long experienced need in the art of stimulating flow of fluids from a substerranean reservoir by a wellbore wherein such flow is impaired by the presence of organic substances of which bacterial slimes, algae, and polymeric substances are among the more common interferents. Reference to a geologic formation so impaired will sometimes be made herein as an organic-congested formation.

The invention is applicable to the treatment of any porous formation. It is particularly useful in treating water-sensitive, fluid-bearing sandstone strata. Such sandstones almost invariably contain some striations or eroded particulate material that renders them water-sensitive to some extent.

The polymeric substances which are most troublesome are frequently polymers or partially degenerated polymers that had previously been injected down the well to attain a specific objective associated with a previous formation treatment. For example, various polymers are useful to lessen fluid-loss of slurries and solutions injected down a wellbore and into a formation or at least in contact therewith including hydraulic fracturing and acidizing compositions. Polymers are also useful as diverting agents in formation treatments. Sometimes an appreciable proportion of the polymer used remains in the interstices of the formation, particularly in the vicinity of the wellbore, often undergoing bacterial action and partial degradation which renders it particularly obstructable to fluid flow.

Other polymeric substances that are troublesome are naturally occurring substances of both small animal and plant life including algae which sometimes grow and multiply around a wellbore to result in a state of near of substantial impermeability.

Treating agents amounting to a rather imposing list have been considered and dried in efforts to lessen these accompanying undesirable effects of the presence of such organic substances. None heretofore has proved fully satisfactory.

Among the more promising materials have been certain chlorine-containing substances which lessen bacterial action, tend to degrade any polymers present, and in general lessen the impairment of permeability properties of the affected formation. The better bactericide employed has been sodium hypochlorite. However, its corrosive attack on metal parts, e.g. pipes, pumps, valves, and the like has been extremely severe. Efforts to inhibit the corrosivity thereof on metal have not been fruitful. No inhibitors heretofore known to be useful in acidic media, e.g. HCl, $H_2SO_4$, and the like, have performed in as effective a manner as was hoped.

The invention may be summarized as a method of effectively destroying organic deposits and accumulations in wells, and formations penetrated thereby, without objectionable detrimental effect on the metal parts encountered or contacted thereby, which encompasses injecting down the well, and back into the organic-congested formation, a composition comprising a hypohalite, selected from the class consisting of water-soluble hypochlorites and hypobromites, and an alkali metal hydroxide inhibitor to the corrosivity of the hypohalite to metals, in an amount sufficient to give an alkaline pH value of at least about 13.

The hypohalites include sodium and potassium hypochlorites and hypobromites and mixtures thereof. The hydroxides include NaOH, KOH, and LiOH. The silicates include all generally known fused $SiO_2$ and $Na_2O$ mixtures having a ratio of $SiO_2/Na_2O$ of from about 0.5 to about 4. This range includes sodium ortho-silicates (a molar ratio of $SiO_2/Na_2O$ of 0.5); meta-silicates (a molar ratio of $SiO_2/Na_2O$ of 1); and more siliceous sodium silicates, e.g. $SiO_2/Na_2O$ of 3.22. The silicates often exist as the hydrates. Silica gels (gelatinous highly hydrated sodium silicates) and water glass (aqueous solution of meta-silicates) may be used in the practice of the invention.

For illustrative purposes, sodium hypochlorite, sodium hydroxide, and/or $Na_2SiO_3 \cdot 9H_2O$ are selected below and the following operational and preferred amounts thereof are recommended for treatment of a geologic formation congested by organic substances including natural and synthetic polymers, at various stages of growth or degeneration and decay.

| Consentration Limits | Operative | Preferred |
|---|---|---|
| Sodium hypochlorite | 0.1%–20% | 1.0%–10% |
| Sodium hydroxide | 0.5%–40% | 2.0%–10% |
| $Na_2SiO_3 \cdot 9H_2O$ (Sodium Silicate) | 2%–40% | 3%–10% |

The invention is practiced by injecting, as by pumping, an aqueous solution of the hypohalite, e.g. sodium hypochlorite, and the inhibitor, e.g. sodium hydroxide and/or sodium silicate, into a well penetrating a formation wherein plugging due to organic material exists. The soltuions may be displaced into the formation by following them with an oil or aqueous liquid. Best results were obtained when the hypohalite-inhibitor solution is followed by an acid solution, e.g., 2–25% HCl, preferably containing an inhibitor to acid attack on metal. The acid in turn can be displaced, preferably an oil base fluid and thereafter the treating liquids reversed out of the well.

Examples for better understanding of the practice of the invention are set out below:

Series one

A high molecular weight copolymer was prepared by copolymerizing a monomeric mixture consisting, by weight, of about 40% of N-vinyl-2-pyrrolidone and 60% of acrylamide, cross-linked with 0.7% by weight N,N-methylenebisacrylamide in the presence of a free radical promoting catalyst, substantially as described in patent application Ser. No. 482,621, filed Aug. 25, 1965. For brevity, such polymer is usually referred to hereinafter as Polymer X. One gram of the copolymer so made was dissolved in successive 100 milliliters volumes of various selected liquids at 175° F. and atmospheric pressure. The tests were for the purpose of showing the extent to which the polymer dissolved in the various selected liquids. The liquids employed and the extent of the resulting dissolution, if any, of the polymer are set out in Table I. This polymer, presently commonly used to divert hydrochloric acid solutions in geologic formations during treatment, sometimes becomes lodged in the pores of a treated formation if it is not used by trained engineers. Once having become so lodged, it is extremely difficult to remove.

TABLE I.—EFFECT OF VARIOUS OXIDIZING AND REDUCING AGENTS ON SWOLLEN POLYMER X
[Test Temperature 175° F.; One Gram of Dry Polymer Added to 100 ml. of Liquid]

| Test Identification | Solvent | Results |
|---|---|---|
| 1 | Water only | No change in 24 hrs. |
| 2 | Water containing 1% sodium persulfate | Slight degradation in 24 hrs. |
| 3 | Water containing 5% sodium persulfate | Moderate degradation in 24 hrs. |
| 4 | Water containing 10% sodium persulfate | 50% degradation in 24 hrs. |
| 5 | Water containing 20% sodium persulafte | Total degradation in 3 hrs. |
| 6 | Water containing 1% potassium periodate | Do. |
| 7 | Water containing 5% hydrazine | No change in 24 hrs. |
| 8 | Water containing 10% hydrazine | Do. |
| 9 | Water containing 17% hydrazine | Do. |
| 10 | Water contianing 1% hydrazine sulfate | Do. |
| 11 | Water containing 5% calcium hypochlorite | Rapid degradation but considerable residue remained at both concentrations. |
| 12 | Water containing 10% calcium hypochlorite | Do. |
| 13 | Water containing 3% hydrogen peroxide | No change in 24 hrs. |
| 14 | Water containing 5% sodium hypochlorite | Total degradation within 10 min. |

Reference to Table I shows that only sodium hypochlorite, Test 1, illustrative of the practice of the invention was a truly effective solvent for the polymer. Calcium hypochlorite (used in comparative Tests 11 and 12), attacked the polymer but formed large volumes of calcium hydroxide which make its use impractical in earthen formations. Hydrogen peroxide (Test 13), hydrazine (Tests 7, 8 and 9), and hydrazine sulfate (Test 10), for example, were shown to be completely ineffective for dissolution of the polymer.

Series two

This series of tests was run to show the corrosion rate on steel pieces in contact with aqueous sodium hypochloride solutions. Steel coupons identified in the metal industry as N80 steel (a common carbon steel) were placed in suitable containers and to each container was added a solution of sodium hypochlorite containing either none or various percents of NaOH as an inhibitor to the corrosivity of the hypochlorite on the steel. Corrosion rate was ascertained by weighing the steel coupons of known total area both before immersion in the solution and after removal therefrom and drying and calculating the weight loss per square foot of metal surface.

TABLE II.—CORROSION OF 5% SOLUTIONS OF NaOCl, CONTAINING NaOH, UPON N80 TUBING
[Pressure: Atmospheric; Temperature: 175° F.; Time: 24 Hours]

| | NaOH concentration in gm./100 ml. of solution | Corrosion rate of metal in pounds/ square foot |
|---|---|---|
| Test Identification: | | |
| 15 | 0 | 0.0665 |
| 16 | 1 | 0.0341 |
| 17 | 2 | 0.0236 |
| 18 | 3 | 0.0235 |
| 19 | 4 | 0.0237 |
| 20 | 5 | 0.0173 |
| 21 | 6 | 0.0049 |
| 22 | 7 | 0.0006 |
| 23 | 8 | 0.0000 |
| 24 | 9 | 0.0000 |
| 25 | 10 | 0.0000 |

Reference to Table II shows that the rate of corrosion of sodium hypochlorite, as illustrated by the 5% aqueous solution thereof, was markedly reduced by the presence of as little as 1 gram of NaOH per 100 milliliters of solution (less than 1%); that at a concentration of 7 grams per 100 milliliters of solution, the rate of corrosion might be considered negligible and in the presence of 8 grams of NaOH per 100 milliliters (less than 8%), no corrosion whatever could be detected. This demonstrates the highly effective inhibiting characteristic of NaOH in the hypochlorite solution.

Series three

This series of tests was conducted to show the inhibiting properties of sodium silicate on the corrosivity of sodium hypochlorite in contact with steel. The silicate employed was $Na_2SiO_3 \cdot 9H_2O$. The aqueous solution again consisted of a 5% by weight solution of sodium hypochlorite containing from 0 to 9% by weight of the silicate. The temperature was 175° F.; the time was 24 hrs.; the pressure was atmospheric. The results are set forth in Table III wherein increasing amounts of the sodium silicate hydrate were admixed with successive samples of the hypochlorite; the corrosion rate of each determined.

TABLE III.—CORROSION OF 5% SOLUTION OF NaOCl, CONTAINING $Na_2SiO_3 \cdot 9H_2O$, UPON N80 TUBING
[Pressure: Atmospheric; Temperature: 175° F.; Time: 24 Hours]

| | $Na_2SiO_3 \cdot 9H_2O$ concentration in gms./100 ml. | Corrosion rate in pounds of metal/ square foot |
|---|---|---|
| Test Identification: | | |
| 26 | 0 | 0.0743 |
| 27 | 1 | 0.1197 |
| 28 | 2 | 0.0278 |
| 29 | 3 | 0.0135 |
| 30 | 4 | 0.0125 |
| 31 | 5 | 0.0085 |
| 32 | 6 | 0.0060 |
| 33 | 7 | 0.0049 |
| 34 | 8 | 0.0026 |
| 35 | 9 | 0.0053 |

Reference to Table III shows that sodium silicate is an effective inhibitor to the corrosivity of the aqueous hypochlorite solution on steel. Although the inhibitory effect is not as pronounced as when the NaOH was used, it is nevertheless highly effective when used in amounts of at least 2 grams of the sodium silicate hydrate per 100 milliliters of the hypochlorite solution.

Series four

This series of tests was conducted to show the effect, if any, of the NaOH on the stability of the sodium hypochlorite solution. The pressure, temperature, and time observed were the same as in series three. N80 steel coupons were again employed in the successive solutions of the hypochlorite. The amounts of NaOH present and the results obtained are set out in Table IV.

TABLE IV.—STABILITY OF 5% SOLUTIONS OF NaOCl, CONTAINING NaOH, IN CONTACT WITH STEEL
[100 ml. of solution in contact with one standard N80 coupon]
Pressure: Atmospheric; Temperature: 175° F.; Time: 24 hours.

| | NaOH concentration in gm./ 100 ml. | Residual NaOCl percent |
|---|---|---|
| Test Identification: | | |
| 36 | 0 | 0.02 |
| 37 | 1 | 0.01 |
| 38 | 2 | 0.28 |
| 39 | 3 | 0.36 |
| 40 | 4 | 0.53 |
| 41 | 5 | 0.62 |
| 42 | 6 | 1.42 |
| 43 | 7 | 1.87 |
| 44 | 8 | 1.80 |
| 45 | 9 | 1.65 |
| 46 | 10 | 1.51 |

Reference to Table IV shows that the NaOH is a valuable aid in preventing decomposition of the sodium hypochlorite. It acts to preserve or improve the stability thereof and accordingly serves a two-fold purpose in the practice of the invention.

Series five

The effect upon the dissolution rate of a polymer by the sodium hypochlorite solution was shown in this series of tests. It was shown in series one that the sodium hypochlorite solution was highly effective to dissolve the difficultly soluble polymer there employed. The same polymer was employed in this series of tests but the sodium hypochlorite solution (with the exception of Test 47) contained increasing amounts of NaOH for the purpose of ascertaining its effect, if any, on the rate of dissolution of the polymer.

TABLE V.—EFFECT OF NaOH CONCENTRATION IN 5% NaOCl UPON DISSOLUTION RATE OF POLYMER X
[2 gm. of 20:80 polymer:water in gel state added to 100 ml. of liquid]
Test Temperature: 175° F.

| Test Identification: | NaOH concentration in gm./100 ml. of solution | Dissolution time in minutes |
|---|---|---|
| 47 | 0 | 16 |
| 48 | 1 | 38 |
| 49 | 2 | 34 |
| 50 | 3 | 28 |
| 51 | 4 | 21 |
| 52 | 5 | 24 |
| 53 | 6 | 32 |
| 54 | 7 | 29 |
| 55 | 8 | 29 |
| 56 | 9 | 39 |
| 57 | 10 | 31 |

Reference to Table V shows that, although the presence of NaOH in the sodium hypochlorite solution lessens the rate of dissolution of the polymer, the solution nevertheless remains highly effective as a solvent for the polymer and appears to be but little changed by the amount of the NaOH present.

Series six

This series of tests was conducted to study the effect of temperature on the solubility of the polymer in the aqueous sodium hypochlorite solutions containing NaOH as an inhibitor to the corrosivity of the hypochlorite on metals in contact therewith. The polymer employed was the same as that employed above. The solution consisted of 5% sodium hypochlorite, 6% NaOH by weight, and balance water. The temperatures and the effect thereof on rate of dissolution are shown in Table VI below.

TABLE VI.—EFFECT OF TEMPERATURE ON DISSOLUTION RATE OF POLYMER IN 5% NaOCl AND 6% NaOH SOLUTION
[2 gms. of 20:80 polymer:water in gel state to 100 ml. of liquid]

| Test Identification: | Temperature in ° F. | Dissolution time in minutes |
|---|---|---|
| 58 | 125 | 67 |
| 59 | 150 | 26 |
| 60 | 175 | 18 |
| 61 | 190 | 14 |

Reference to Table VI shows that the time required to dissolve the polymer decreases with the rise in temperature. In other words, the rate of dissolution is inverse to the temperature. However, excellent results are obtained at any temperature of 150° F. or above and acceptable results may be considered obtainable at as low as 100° F. Best results would be obtained in formations having temperature of 175° F. and higher.

Series seven

This series of tests, numbered 62 to 70 was conducted to show the effect of a composition required by the practice of the invention, as illustrated by a 5% NaOCl-6% NaOH aqueous solution, on Berea sandstone cores, including those damaged by water, those undamaged by water, and those impregnated with natural or synthetic polymers. The tests were conducted by preparing two-inch diameter cores of suitable length and placing the cores in a Hassler-type permeability cell as described in API RP 40 First Ed. (August 1960) page 35, and depicted there as FIG. 3.5.15F2. The various permeability values were then obtained on the various cores after passing each of a series of aqueous solutions therethrough, as described below, specifically the results thereof being set out in Table VII, infra.

*Test 62.*—A Berea core was tested by passing a 3% by weight aqueous solution of NaCl (brine) therethrough, determining the permeability, then passing fresh water therethrough and again determining the permeability.

*Test 63.*—A second Berea core was tested by passing first a 3% aqueous solution of NaCl, then a 5% NaOCl-6% NaOH solution then additional 3% NaCl solution, and finally fresh water. The effect on permeability by each liquid was determined.

*Test 64.*—A third Berea core was tested by first passing API brine (2% CaCl$_2$ and 8% NaCl by weight aqueous solution) therethrough, then 5% NaOCl-6% NaOH solution, then more API brine. The effect on permeability by each liquid in sequence was determined.

*Test 65.*—A fourth Berea core was tested by first passing therethrough 3% NaCl aqueous solution, then 5% NaOCl-6% NaOH solution, thereafter fresh water, and again 5% NaOCl-6% NaOH. The effect on permeability by each liquid was determined in sequence.

*Test 66.*—A fifth Berea core was tested by first passing therethrough a 3% aqueous solution of NaCl followed by an aqueous solution of an inhibited 15% HCl solution. The effect on permeability values was determined by each liquid.

*Test 67.*—A sixth Berea core was tested by first passing therethrough 3% aqueous NaCl, thereafter impregnating the core with an alginate slime scraped from water coolers and dispersed in 3% NaCl brine; then passing a 5% NaOCl-6% NaOH solution through the core, and finally passing 5% by weight aqueous uninhibited HCl solution therethrough. The effect on permeability of each liquid was determined in sequence.

*Test 68.*—A seventh Berea core was tested by first passing a 3% NaCl solution therethrough, then impregnating the core with alginate slime scraped from water coolers and dispersed in 3% NaCl brine thereafter a 15% aqueous solution of inhibited HCl, and finally a 5% NaOCl-6% NaOH solution. The effect on permeability by each liquid was determined.

*Test 69.*—An eighth Berea core was tested by passing first a 3% aqueous solution of NaCl therethrough, then impregnating the core by passing a dense slurry of Polymer X dispersed in 3% NaCl brine thereinto, thereafter passing a solution of 5% NaOCl-6% NaOH therethrough, and finally passing a 15% aqueous solution of inhibited HCl therethrough. The effect on permeability by each liquid was determined.

*Test 70.*—A ninth Berea core was tested by passing first a 3% aqueous solution of NaCl therethrough, then impregnating the core by passing a dense slurry of Polymer X in 3% aqueous NaCl therethrough, thereafter passing a solution of 5% NaOCl-6% NaOH, and finally a 15% aqueous solution of inhibited HCl therethrough. The effect on permeability by each liquid was determined.

By inhibited HCl acid or inhibited HCl aqueous solution is meant such acid or solution containing an effective amount, e.g. 0.05 to 1.0% by weight of an inhibitor to acid corrosive attack on metals. The inhibited acid used in this series of tests was 15% aqueous HCl containing 0.4% by weight of the inhibitor described in U.S. Patent 3,077,454.

The various permeability values in millidarcies are set out in Table VII wherein each permeability value is entered on the table directly below the description of the aqueous liquid which was injected into the core.

TABLE VII.—PERMEABILITY CHANGES RESULTING FROM VARIOUS CORE TREATMENTS STATED IN MILLIDARCIES (md.)
Berea Sandstone Cores Tested at 500 p.s.i. Injection Pressure at 125° F. (Except Test 70 at 175° F.)

| Test Identification | Each Core Pre-saturated with 3% NaCl Brine, as Shown | | | |
|---|---|---|---|---|
| 62 | 3% NaCl¹/14.0 md | Fresh Water/0.8 md | | |
| 63 | 3% NaCl/17.0 md | 5% NaOCl-6% NaOH¹/8.0 md | 3% NaCl/11.0 md | Fresh Water/1.8 md |
| 64 | API Brine 9.8 md | 5% NaOCl-6% NaOH/2.1 md | API Brine/9.6 md | |
| 65 | 3% NaCl/17.1 md | 5% NaOCl-6% NaOH/11.6 md | Fresh Water/2.2 md | 5% NaOCl-6% NaOH/1.4 md |
| 66 | 3% NaCl/29.0 md | Inhibited 15% HCl¹/25.0 md | | |
| 67 | 3% NaCl/22.6 md | Slime in 3% NaCl¹/2.1 md | 5% NaOCl-6% NaOH/6.8 | 15% HCl/17.1 md |
| 68 | 3% NaCl/31 md | Slime in 3% NaCl/1.6 md | Inhibited 15% HCl/1.0 md | 5% NaOCl-6% NaOH/3.4 md |
| 69 | 3% NaCl/29.5 md | Polymer X in 3% NaCl¹/1.8 md | 5% NaOCl-6% Na OH/1.5 md | Inhibited 15% HCl/4.5 md |
| 70 | 3% NaCl/23.3 md | Polymer X in 3% NaCl Solution/1.2 md | 5% NaOCl-6% NaOH/0.8 md | Inhibited 15% HCl/33.5 md |

¹ All refer to the material dissolved in enough water to make 100% by weight.

Reference to Table VII clearly supports the following conclusions, based on the tests of various Berea cores, each pre-saturated with a 3% NaCl brine:

*Test 62.*—The introduction of fresh water into the core caused a marked decrease in permeability, actually the permeability was somewhat less than 6% of the permeability to a 3% NaCl brine.

*Test 63.*—The introduction of the sodium hypochlorite-sodium hydroxide solution (the treating composition according to the invention), followed by NaCl brine and then fresh water showed that such solution lessened the adverse effect of fresh water on the permeability.

*Test 64.*—The introduction of the treating composition of the invention into the core had no significant effect upon the core permeability to 3% NaCl brine, i.e. a formation is not damaged by the composition employed in the invention.

*Test 65.*—The introduction of the treating composition employed in the invention cannot correct the damage previously done by fresh water.

*Test 66.*—The treatment of a test core by inhibited HCl acid does not adequately improve the permeability; a moderate reduction in permeability resulted.

*Test 67.*—When dispersed bacterial slime is forced into the NaCl brine saturated core until the permeability is reduced to 2.1 md., and thereafter the NaOCl-NaOH employed in the invention passes therein, a very gratifying increase in permeability ensued, approaching that of the original core.

*Test 68.*—When a core is treated similarly to Test 76, except that the order of using NaOCl-NaOH and the HCl acid is reversed, the permeability of the core is shown to be badly impaired.

*Test 69.*—When a core is impregnated with Polymer X (the cross-linked 60% acrylamide and 40% N-vinylpyrrolidone copolymer) and subsequently treated successively with the NaOCl-NaOH solution used in the invention and inhibited 15% HCl, the permeability is improved to some extent but not to the extent of the improvement attained against the natural slime.

*Test 70.*—However, when the temperature of the core is raised 50 Farenheit degrees (to 175° F.) very satisfactory permeability is regained in a formation, plugged by the difficultly degraded polymer, by use of the NaOCl-NaOH solution.
by the difficultly degraded polymer, by use of the NaOCl-NaOH solution.

The tests of series seven show the efficacy of the sodium hypohalite-sodium hydroxide aqueous solution, in general, on cores taken from water-sensitive geologic formations. The tests show especially the efficacy of the practice of the invention when the hypochlorite-hydroxide solution is followed by an acid flush, sometimes called an acid chaser.

Field example

*Test 71.*—An oil well in the South Pass, Block 24 Field in Plaquemine Parish, Louisiana was completed in a Miocene formation at a depth of 7,880 feet. Bottom hole temperature was 175° F. The well had been provided with a 16-foot gravel pack (comprising 20–40 mesh sand) at the producing interval at the level of 7,864 to 7,880 feet to prevent sanding in of the well. The well had been acidized employing a dispersed polymer in the aqueous acidizing solution and following treatment was not producing as expected. It appeared that an excessive amount of polymer had been used for the conditions existing in the formation and such excess had not been returned by recirculating as is usual under such circumstances. The well was equipped with a casing and tubing and a packer positioned in the annulus between casing and tubing above the producing interval.

The well was treated according to the invention, as follows:

The annulus between tubing and casing was filled with brine. The tubing was then filled with diesel fuel and a pump in rate, into the formation, of one-half barrel per minute at 600 pounds per square inch pressure was established. This was followed by 1,000 gallons of a solution composed of 5% sodium hypochlorite and 5% sodium hydroxide. This solution was pumped in increments of 100 gallons with a 30 minute period allowed between each 100 gallons pumped. Consequently, 5 hours were required to pump the entire 1,000 gallons of the 5% sodium hypochlorite-5% sodium hydroxide solution. This solution was followed by 200 gallons of a water spacer. The spacer was followed with 2,000 gallons of 15% hydrochloric acid containing 0.2% hexynol. The hexynol was present as an inhibitor to prevent chemical attack of the acid upon the metal. A sufficient amount of diesel oil was then pumped to force the acid remaining in the tubing into the formation and leave the tubing full of diesel oil. The well was then shut in and allowed to stand for 24 hours.

Prior to the treatment, the well had been producing at a rate of only 18 barrels of oil per day. Following the treatment, production was 140 barrels of oil per day, a striking and gratifying improvement.

The above described field example illustrates the practice of the invention, but includes certain steps including filling the annulus with a brine and then injecting down the tubing a pre-acid treatment prior to the injection of the inhibited polymer-solvent according to the invention. The after flush acid treatment employed in this example illustrates a preferred practice of the invention as aforesaid.

Only the injection of the aqueous solution of the selected water-soluble hypohalite containing the water-soluble silicate or hydroxide is essential. The after flush employing an aqueous acid solution illustrates the preferred embodiment. The other steps observed in the field example are non-essential for the practice of the invention.

Having described my invention, what I claim and desire to protect by Letters Patent is:

1. The method of improving the permeability of a porous geologic formation wherein organic polymeric materials are lodged in the pores which comprises injecting into the formation an aqueous composition comprising water, a water-soluble hypohalite, and a sufficient amount of an alkali metal hydroxide to result in an alkaline pH value of said composition of at least about 13 to inhibit the corrosivity of the hypohalite to metal parts encountered, whereby said polymeric materials are at least partially solubilized to facilitate removal from the formation and the permeability thereof thus improved.

2. The method according to claim 1 wherein the hypohalite is sodium hypochlorite.

3. The method according to claim 1 wherein the hypohalite is employed in an amount of between about 0.1% and about 20.0%, based on the weight of the aqueous composition.

4. The method according to claim 3 wherein the amount of the hypohalite is between about 1.0% and about 10.0%, based on the weight of the aqueous solution.

5. The method according to claim 1 wherein the injection of the aqueous solution of hypohalite and inhibitor to the corrosivity thereof is followed in next succession by the injection of an aqueous acid.

6. The method according to claim 5 wherein the acid is a 2% to 30% aqueous solution of HCl containing an inhibitor to corrosivity of acid to metal.

7. The method according to claim 6 wherein the inhibitor to corrosivity of acid is that prepared in accordance with Example 2 of U.S. Patent 3,077,454.

8. The method according to claim 1 wherein the inhibitor to corrosivity of the hypohalite is between about 0.5 percent and about 10 percent, based on the weight of said aqueous solution.

9. The method according to claim 1 wherein the alkali metal hydroxide is sodium hydroxide.

10. The method according to claim 9 wherein the amount of the sodium hydroxide is between about 0.5% and 40% based on the weight of the aqueous solution.

11. The method according to claim 9 wherein the amount of sodium hydroxide is between about 2.0% and 10.0%, based on the weight of the aqueous solution.

References Cited

UNITED STATES PATENTS

| | | | |
|---|---|---|---|
| 1,834,783 | 12/1931 | Johnson | 252—387 X |
| 2,105,839 | 1/1938 | McNutt | 252—387 X |
| 2,429,593 | 10/1947 | Case. | |
| 2,560,331 | 7/1951 | Buchan | 166—1 |
| 3,077,454 | 2/1963 | Monroe et al. | |
| 3,122,503 | 2/1964 | Katzer | 166—44 X |
| 3,249,536 | 5/1966 | Jones. | |
| 3,372,748 | 3/1968 | Cook | 116—9 |

OTHER REFERENCES

Am. Pet. Inst., Secondary Recovery of Oil in the United States. New York, A.P.I. 2d. ed., 1950, pp. 363–364.

CHARLES E. O'CONNELL, Primary Examiner

U.S. Cl. X.R.

166—312; 252—387